United States Patent
Duart Gomez et al.

(10) Patent No.: US 9,362,721 B1
(45) Date of Patent: Jun. 7, 2016

(54) CIRCUITS AND METHODS FOR PROTECTING INTEGRATED CIRCUITS FROM POWERLINE NOISE

(75) Inventors: Jose Miguel Duart Gomez, Benifaio (ES); Jose Luis Gonzalez Moreno, Xirivella (ES); Alejandro Acuna Munoz, Paterna (ES)

(73) Assignee: Marvell International Ltd., Hamilton (BM)

( * ) Notice: Subject to any disclaimer, the term of this patent is extended or adjusted under 35 U.S.C. 154(b) by 912 days.

(21) Appl. No.: 13/367,940

(22) Filed: Feb. 7, 2012

Related U.S. Application Data

(60) Provisional application No. 61/440,235, filed on Feb. 7, 2011.

(51) Int. Cl.
| | |
|---|---|
| *H01T 4/06* | (2006.01) |
| *H04M 3/18* | (2006.01) |
| *H01T 1/14* | (2006.01) |
| *H01T 4/08* | (2006.01) |
| *H04Q 1/14* | (2006.01) |

(52) U.S. Cl.
CPC .. *H01T 4/06* (2013.01); *H01T 1/14* (2013.01); *H01T 4/08* (2013.01); *H04M 3/18* (2013.01); *H04Q 1/146* (2013.01)

(58) Field of Classification Search
CPC ............... H01T 4/06; H01T 1/14; H01T 4/08; H04M 3/18; H04Q 1/146
USPC .................................................... 361/119, 56
See application file for complete search history.

(56) References Cited

U.S. PATENT DOCUMENTS

| | | | | |
|---|---|---|---|---|
| 3,566,272 A | * | 2/1971 | Goldbach | H01F 27/367 455/127.1 |
| 3,587,562 A | * | 6/1971 | Williams | A61B 5/04004 128/902 |
| 4,577,255 A | * | 3/1986 | Martin | H04M 3/18 361/119 |
| 2010/0067154 A1 | * | 3/2010 | Deng et al. | 361/56 |

* cited by examiner

*Primary Examiner* — Thienvu Tran
*Assistant Examiner* — David M Stables

(57) ABSTRACT

In one embodiment, a circuit couples an integrated circuit to a powerline and protects the integrated circuit from overvoltage noise. In one example, the integrated circuit comprises a two-port differential transceiver. Respective Schottky diodes couple the ports to a power supply and reference, so one diode for each port conducts current in forward bias if an applied voltage exceeds a respective voltage reference plus the forward voltage of that diode. A respective end of a first transformer winding feeds each input port. Respective ends of a second transformer winding couple to capacitors that couple with the powerline. Back-to-back zener diodes are connected between the ends of the second winding. A zener diode with a breakdown voltage set based on the power supply voltage plus a margin is coupled between the power supply and ground so that the power supply voltage does not exceed a desired value plus the margin.

19 Claims, 7 Drawing Sheets ized as channel 27, without its constituent components specifically identified. When the diodes are forward biased, they present a low resistance connection to power supply rails, such as ground and Vdd. Therefore, noise energy is largely absorbed by resistor 19 because transceiver 15 has high impedance inputs compared with resistor 19.

It is generally desirable to reduce noise at the input of the transceiver to improve communications.

SUMMARY

Embodiments of the present disclosure include circuits and methods for protecting integrated circuits from powerline noise.

In one embodiment, a circuit comprising a pair of capacitors, a transformer, a pair of zener diodes, and first and second pairs of diodes. Each capacitor of the pair of capacitors has a first terminal and a second terminal, the first terminals having a powerline voltage applied therebetween. A first winding and a second winding of the transformer each have a first end and a second end. The first end of the first winding is electrically connected with the second terminal of one capacitor of the pair of capacitors, and the second end of the first winding is electrically connected with the second terminal of an other capacitor of the pair of capacitors. Anodes of each zener diode are electrically connected, and cathodes of each zener diode are coupled to a different one of the first end and the second end of the first winding of the transformer. An anode of a first diode in the first pair of diodes is electrically connected to a reference voltage, and a cathode of the first diode is electrically connected to an anode of a second diode in the first pair of diodes, to the first end of the second winding of the transformer, and for electrical connection to a first port of an integrated circuit, and a cathode of the second diode is electrically connected to a power supply and a first terminal of a first zener diode, wherein a second terminal of the first zener diode is electrically connected to the reference voltage. An anode of a third diode in the second pair of diodes is electrically connected to a reference voltage, and a cathode of the third diode is electrically connected to an anode of a fourth diode in the second pair of diodes, to the second end of the second winding of the transformer, and for electrical connection to a second port of the integrated circuit, and a cathode of the fourth diode is electrically connected to the power supply and a first terminal of a second zener diode, wherein a second terminal of the second zener diode is electrically connected to the reference voltage.

In one embodiment, a breakdown voltage of the first zener diode and the second zener diode is set at a voltage of the power supply plus a maximum expected variation in the voltage of the power supply.

Other embodiments include a powerline communication system comprising a differential transceiver having a first port and a second port, first and second diodes electrically connecting a reference voltage to each of the first port and the second port, respectively, third and fourth diodes electrically connecting a power supply to each of the first port and the second port, respectively, first and second zener diodes each coupled between the power supply and the reference voltage and having a breakdown voltage greater than a voltage of the power supply, a transformer configured to step up a voltage difference applied by the differential transceiver across the first port and the second port from a first winding to a second winding, the second winding having a first end and a second end, a pair of zener diodes with respective cathodes coupled to one of the first end and the second end of the second winding and with anodes coupled together, and a pair of capacitors, each capacitor connected in series between a powerline and one of the first end and the second end of the second winding.

In one embodiment, the pair of zener diodes are configured as a low pass filter.

In one embodiment, the first and second diodes are configured as a first high pass filter and the third and fourth diodes are configured as a second high pass filter.

In another embodiment, a method comprises receiving a powerline signal from a powerline, low pass filtering the powerline signal, said low pass filtering comprising receiving the powerline signal on a first winding of a transformer, wherein the first winding of the transformer is coupled to at least one zener diode, and high pass filtering the powerline signal, said high pass filtering comprising transmitting the powerline signal on a second winding of the transformer, wherein the second winding of the transformer is coupled to a power supply through a first diode and to a reference voltage through a second diode, wherein the first diode and second diode define a maximum voltage range of the powerline signal.

In one embodiment, the method further comprises transmitting a signal from the integrated circuit, high pass filtering the transmitted signal using the first diode and second diode, and low pass filtering the transmitted signal using the at least one zener diode.

In one embodiment, the transformer attenuates the powerline signal.

The following detailed description and accompanying drawings provide a better understanding of the nature and advantages of the present disclosure.

DETAILED DESCRIPTION

Described herein are circuits and methods for protecting ICs from power main noise. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 2:
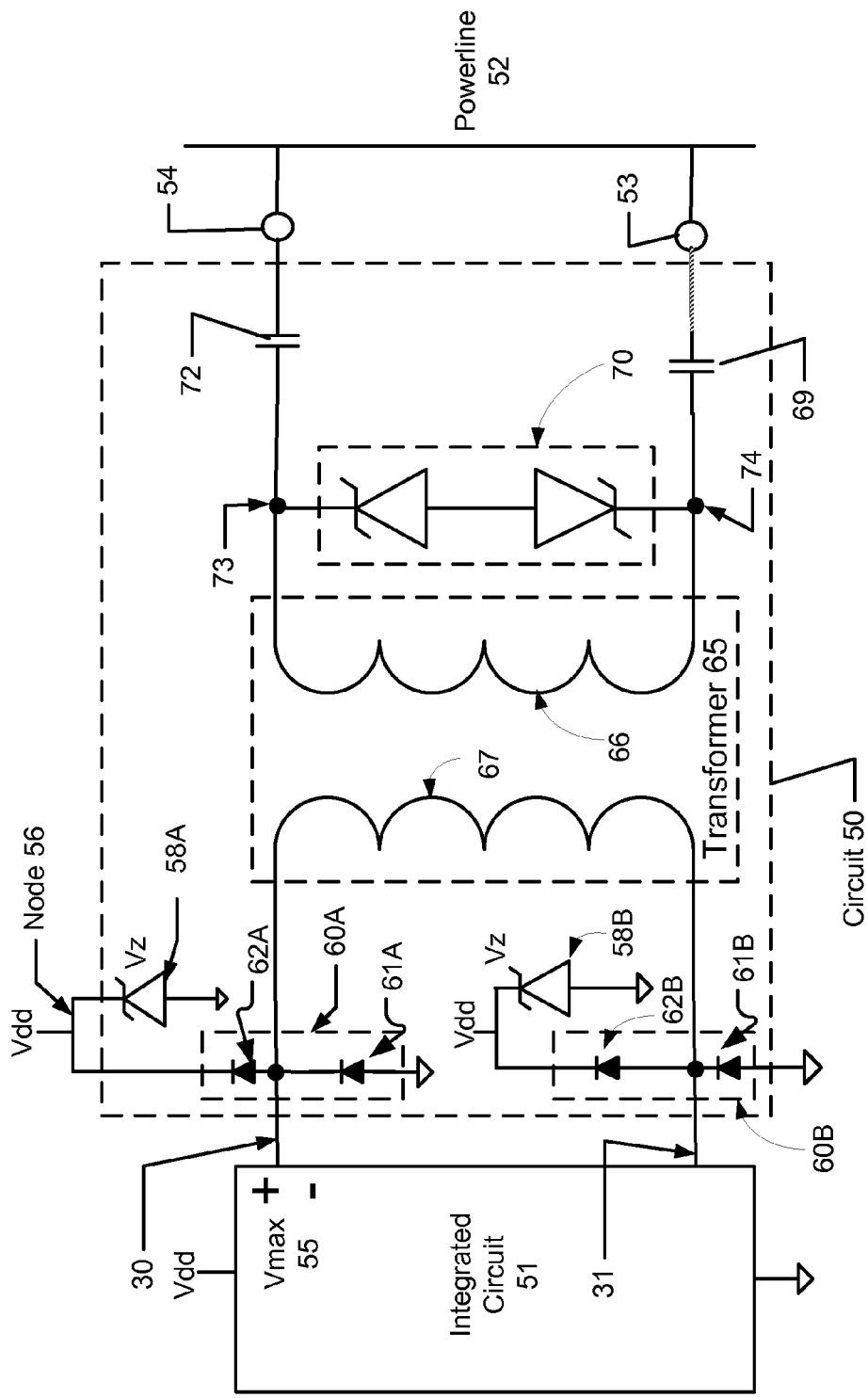
FIG. 2 an example of a protection circuit in a context of multiport Integrated Circuit (IC) according to an embodiment.

FIG. 2 depicts an example of a circuit 50 for coupling an integrated circuit 51 with a powerline 52. Circuit 50 is a differential signaling circuit with parallel channels. Beginning from powerline 52, circuit 50 includes a coupler 54 that interfaces powerline 52 with a capacitor 72. Coupler 54 can include a structure to make an electrical contact with a powerline 52. In an example, coupler 54 can include a prong of a power plug, for example. A variety of components can intermediate an electrical connection between circuit 50 and powerline 52 and would be determined according to a specific application.

Coupler 54 of powerline 52 is coupled through capacitor 72 to one terminal of a back-to-back zener diode pair 70 at node 73. An opposite terminal of zener diode pair 70 is coupled through a capacitor 69 at node 74 to another coupler 53 of powerline 52. Each zener diode in zener diode pair 70 may have zener voltage, Vz, of 12 volts, for example. The terminals of the zener diode pair at nodes 73 and 74 may each include a parasitic capacitance (e.g., 100 pf) as described in more detail below.

A transformer 65 has two windings 66 and 67 generally referred to as the primary and secondary windings, respectively. Each winding has two wire ends. Respective wire ends of a first winding 66 are couple to nodes 73 and 74. Respective wire ends of the second winding 67 are coupled to different input ports 30 and 31 of integrated circuit 51.

A first wire end of the second winding 67 is coupled to port 30 of integrated circuit 51. A pair of series-connected Schottky diodes 60A comprise a first Schottky diode 61A and a second Schottky diode 62A. An anode of Schottky diode 61A is coupled to a voltage reference, such as ground, for example. A cathode of Schottky diode 61A is coupled to an anode of Schottky diode 62A and also to port 30 of integrated circuit 51. A cathode Schottky diode 62A is coupled to a power supply voltage, Vdd. A node 56 identifies a connection point between the cathode of Schottky diode 62A, Vdd, and a reverse-connected zener diode 58A. The other end of Zener diode 58A is coupled to a reference (e.g., ground). Schottky diode pair 60A can be implemented to reduce asymmetry, such as by encapsulating both diodes 61A and 62A in a single package, such as a SOT-23 package. When laying out circuit 50, Schottky diode pair 60A may advantageously be positioned physically close to port 30. A second wire end of the second winding 67 is coupled to port 31 of integrated circuit 51. Substantially the same circuitry is coupled to port 31, including a pair of series-connected Schottky diodes 60B, comprising a first Schottky diode 61B and a second Schottky diode 62B, and a reverse-connected zener diode 58B. The terminals of the Schottky diodes 61A and 62A at port 30 may include a parasitic capacitance (e.g., 1-5 pf) as described in more detail below. Similarly, the terminals of the Schottky diodes 61B and 62B at port 31 may include a parasitic capacitance (e.g., 1-5 pf) as described in more detail below.

Zener diodes 58A-B have a zener voltages, Vz, determined according to a value of Vdd (e.g., Vdd plus a margin). In one example, the margin is determined according to a power supply specification that indicates a maximum allowable range of Vdd. In an example implementation, Vdd may vary within a range of 5% of Vdd. Thus, where Vdd is 5V, Vz may be around 5.6 V for a 5% Vdd variation.

Integrated circuit 51 has a maximum tolerable voltage range (Vmax) 55 at input ports 30 and 31. Maximum tolerable voltage range 55 relates to a variety of factors including a process technology used to fabricate that portion of integrated circuit 51, sizes of transistors and other features used in that portion of integrated circuit 51, as well as the value of Vdd. Non-CMOS technology can tolerate higher voltages than a logic-oriented or a low-power analog oriented CMOS design process, which may be used implement the circuitry for input port 54. In typical powerline communication circuits, it has been the case that Vdd is higher than what can be tolerated by such CMOS technologies (e.g., on the order of 12V), while an upper end of such CMOS processes may be around 5V. However, particular embodiments may be implemented using CMOS technology and a Vdd of 5V. Therefore, one implementation comprises an integrated circuit 51 with an analog front end implemented in pure CMOS, powered by a Vdd of about 5V or less, and which is coupled to a powerline 52 through circuitry described herein.

Figure 1:
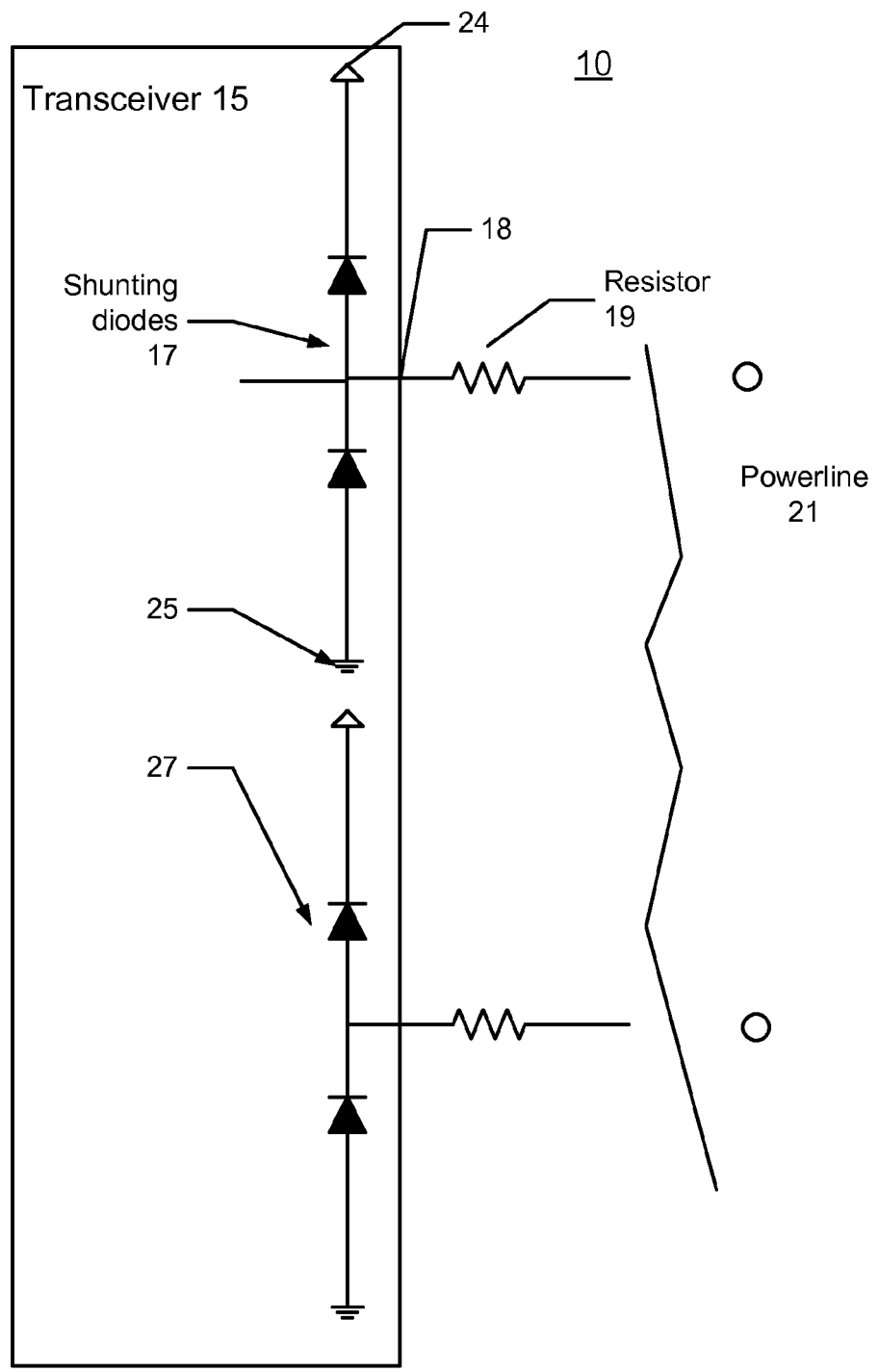
FIG. 1 depicts a prior art protection circuit.
Figure 3:
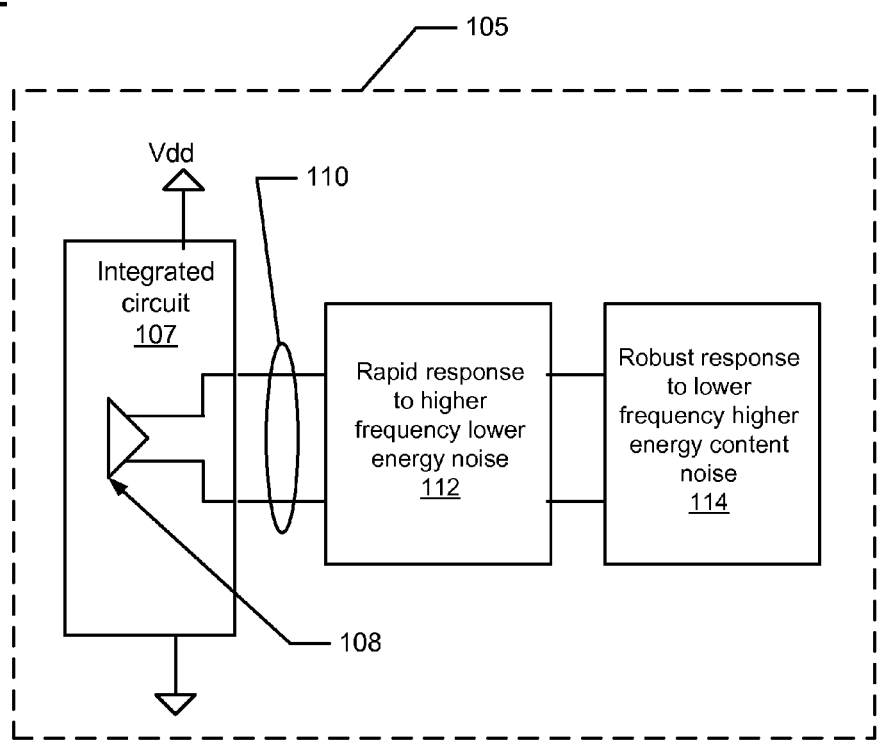
FIG. 3 depicts a modular perspective of protection circuits according to an embodiment.

FIG. 3 illustrates a circuit 105 as multiple functional modules according to another embodiment. Circuit 105 includes integrated circuit 107 and two modules 112 and 114 representative of the operational aspects of circuit 50 of FIG. 2, for example. Circuit 105 may be implemented on a circuit board, for example. An integrated circuit 107 includes analog circuitry 108. In this example, analog circuitry 108 is an analog front end for a powerline infrastructure communication circuit. Integrated circuit 107 has one or more connections to a power supply voltage, Vdd, and another reference, such as a ground or a negative Vdd. A low resistance coupling 110 couples analog circuitry 108 to module 112 that has a rapid response time to higher frequency noise received from a powerline. Module 112 may correspond to the components between the secondary winding 67 and ports 30 and 31 in FIG. 2, for example. Low resistance coupling 110 also results in low attenuation of transmitted signals from analog circuitry 108 for transmission on a powerline. In particular, the attenuation caused by low resistance coupling 110 is less than an attenuation resulting from using a resistor in series with the transmission path (as in the circuit of FIG. 1). Low resistance coupling 110 may comprise parasitic resistive characteristics, but in this example low resistance coupling 110 does not include a series resistor.

Module 112 is coupled to module 114. Module 114 is capable of a robust response to lower frequency but higher energy noise compared to module 112, which may be injected by a powerline into module 114. Module 114 also can block the primary 50 Hz or 60 Hz signal from a powerline. Module 114 may correspond to the components between the powerline 52 and primary winding 66 in FIG. 2, for example. Accordingly, protection of analog circuitry 108 can be implemented in multiple stages of modules where each stage is focused on a different portion of unwanted energy received from a powerline. FIG. 3 also depicts a circuit arrangement where powerline protection is achieved with a lower resistance transmit path for analog circuitry 108 (e.g., no resistors in the transmit path). In one aspect, absence of a series resistor in the transmit path (as compared with the circuit depicted in FIG. 1) is indicative of a lower resistance transmit path. An example low attenuation of a powerline protection circuit for integrated circuit 107 is an attenuation on the order of −3 Decibels within a bandwidth of interest. In one example implementation, one or more modules may be configured to provide a transmit envelope of under 10V peak to peak and a transformer step up of around 2:1 to drive a powerline.

Figure 4:
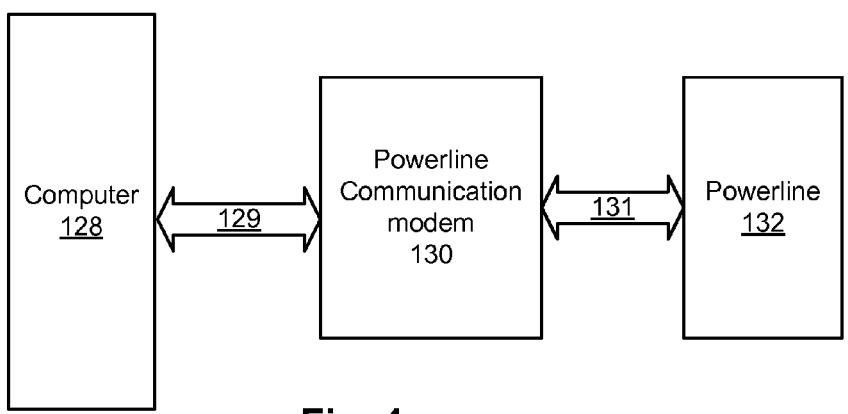
FIG. 4 depicts a system in which a protection circuit can be used to protect a power line communication IC provided in a power line communication MOdulator/DEModulator (MODEM)

FIG. 4 depicts a system according to another embodiment. FIG. 4 depicts that a computer 128 can generate data traffic to be transmitted on a signal path 129 to a powerline communication modem 130. Powerline communication modem 130 may be implemented using the circuit shown in FIG. 3, for example, on a circuit board. Modem 130 communicates over a signal path 131 to a powerline 132. In one embodiment, the circuits of FIGS. 3 and 4 may be implemented using a circuit board that combines integrated circuit 107 with discrete components implementing the modules 112 and 114. An implementation of disclosed protection circuits entirely of discrete components is considered appropriate for particularly harsh environments in which peak noise voltages may be in excess of several hundred volts, such as peak to peak voltage swings on the order of 200, 300, or even 600V. In such environments, both low frequency and high frequency noise may be present. For a power line communication circuit application, an example of high frequency noise is noise that has energy content at frequencies in on the order of 20-50 MHz, and with peak to peak voltages upwards of 500V. In other embodiments, the modules may be integrated with integrated circuit 107 using appropriate integrated circuit process technology. The example in FIG. 4 identifies a computer 128 using modem 130 to communicate over powerline 132. However, computer 130 is an example, and the arrangement can be extended to other electronic systems.

Figure 5:
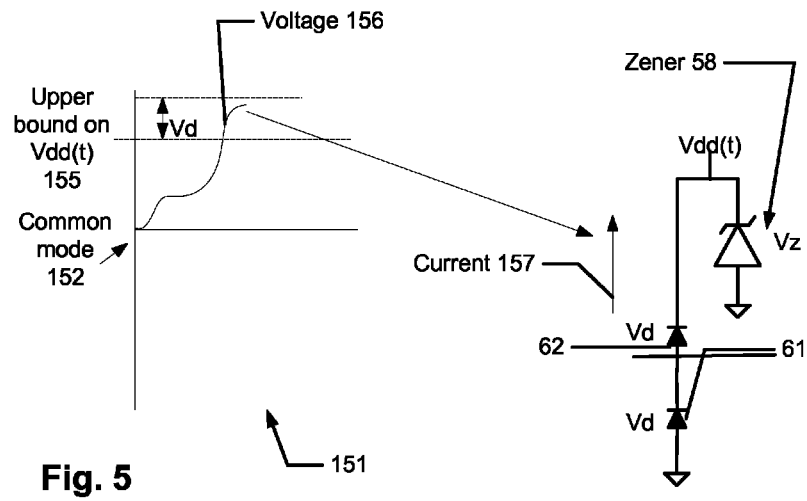
FIGS. 5 and 6 depict aspects of how particular circuit embodiments may behave under different conditions.
Figure 6:
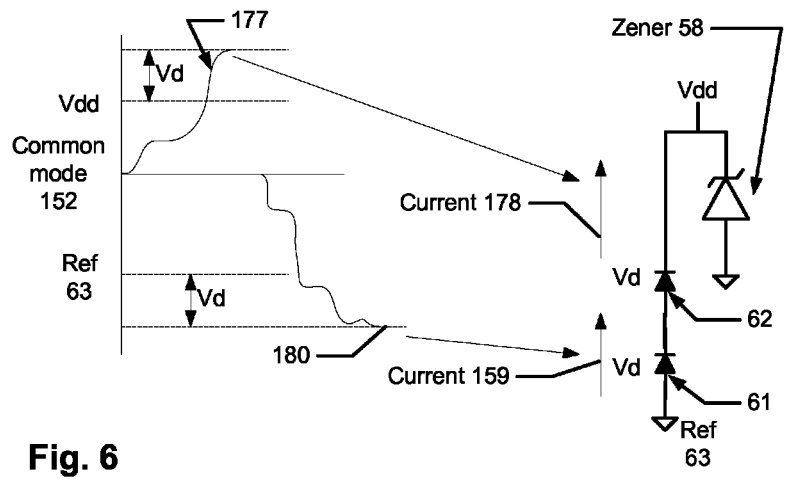

FIG. 5 and FIG. 6 depict aspects of operation of the circuit introduced in FIG. 2. FIG. 5 addresses transient operation during a period shortly after a device containing the circuit is coupled to powerline. During that period of time Vdd supplied by a power supply may not yet be stabilized. Where Vdd is not stabilized, Vdd is not a reliable reference for use as an upper voltage limit to protect the integrated circuit. Rather, for transient situation, Zener diode 58 establishes an upper bound on Vdd, depicted as upper bound 155 for a time varying Vdd, Vdd(t), in graphical illustration 151. A common mode operating point 152 is depicted in graphical illustration 151 and may be a zero voltage value for a dual power supply implementation, or it may be some voltage around the midpoint of Vdd, for example. A voltage drop, Vd, across Schottky diode 62 is shown in graphical illustration 151 as additive to upper bound 155. A sum of Vd of Schottky diode 62 and upper bound 155 should be designed to be less than a voltage that would damage the integrated circuit to be protected. FIG. 5 depicts that a time-varying input voltage 156 (e.g., at node 30 in FIG. 2) may rise to a level approaching the sum of upper bound 155 and Vd. As input voltage 156 reaches that voltage level, current 157 through Schottky diode 62 increases to cause Zener diode 58 to turn on in the reverse direction while Schottky diode 62 is forward biased enough to conduct. In practice, such components all have tolerance values, and a precise behavior of Zener diode 58 and Schottky diode 62 can be characterized for a particular implementation as needed.

FIG. 6 depicts an operational situation in which Vdd has been stabilized. In such operational situations, Zener diode 58 largely will be off and not conducting appreciable current (except perhaps for some leakage current). Therefore, the value of Vdd itself establishes an operating point at which Schottky diode 62 will turn on in response to a positive input voltage 177. Input voltage 177 can approach a value of Vdd plus the Vd of Schottky diode 62. If the input voltage 177 increases above Vdd plus Vd, Schottky diode 62 turns on in forward bias to conduct current 178 and maintain the input voltage within acceptable boundaries.

Referring to input voltage 180, reference 63 (e.g., ground) serves a purpose similar to Vdd for input voltages less than common mode 152. Reference 63, in conjunction with a Vd of Schottky diode 61, establishes a lower bound for the magnitude of the input voltage. As a magnitude of the input voltage increasingly approaches a magnitude of reference 63 minus the Vd of Schottky diode 61, current 159 through Schottky diode 61 increases. To be specific, Schottky diode 61 will turn on when the input voltage is more negative than reference 63 by at least the Vd of Schottky diode 61. The activation of Schottky diode 61 causes the input voltage to become less negative until Schottky diode 61 begins to turn off.

Figure 7:
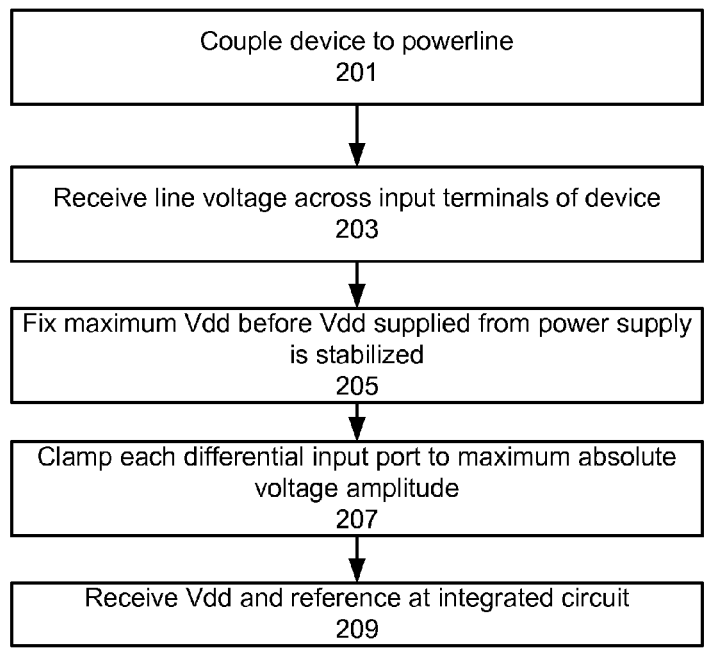
FIGS. 7 and 8 depict method aspects of circuit behavior according to an embodiment.

FIG. 7 depicts a method 200 according to a particular embodiment. At 201, a device including an implementation of circuit 50 of FIG. 2 is coupled to a powerline. At 203, the device begins to receive powerline voltage across its input terminals. At 205, a maximum voltage at a Vdd node is fixed until the power supply Vdd has stabilized its output. At 207, each of two input ports for a differential transceiver integrated circuit is clamped so that the maximum absolute value of voltage permitted at each port remains within a determined range of values. In some implementations, maximum and minimum values can be determined based on the Vdd and reference (e.g., ground) expected to be provided to the integrated circuit.

Figure 8:
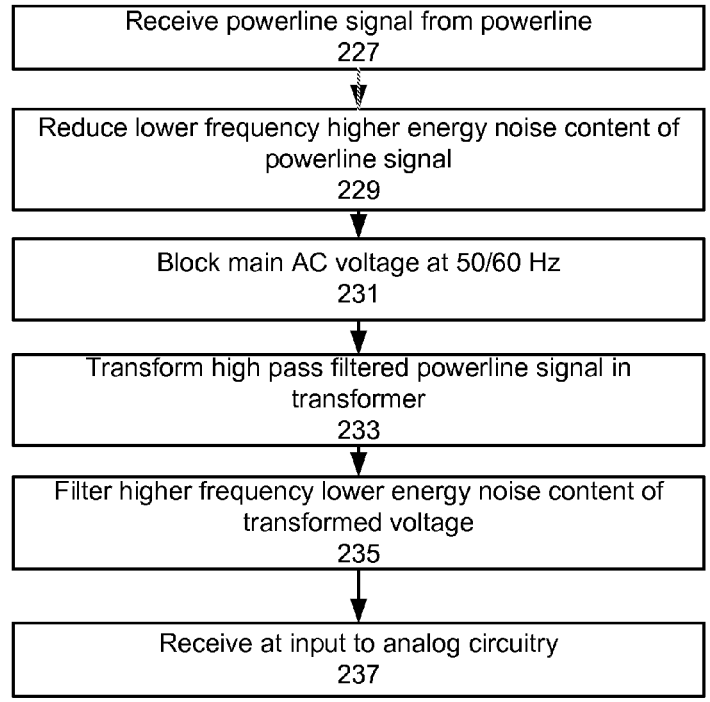

FIG. 8 depicts a method 225 following a transient period according to another embodiment. At 227, a powerline signal is received from a powerline as a voltage. At 229, lower frequency and higher energy noise content of the received powerline signal is reduced. At 231, a main AC voltage, typically at either 50 Hz or 60 Hz is blocked. At 233, the resulting voltage waveform is transformed to a lower voltage.

At 235, the transformed powerline signal is filtered to reduce higher frequency lower energy noise content. At 237, the resultant powerline signal is received as an input to analog circuitry.

Figure 9:
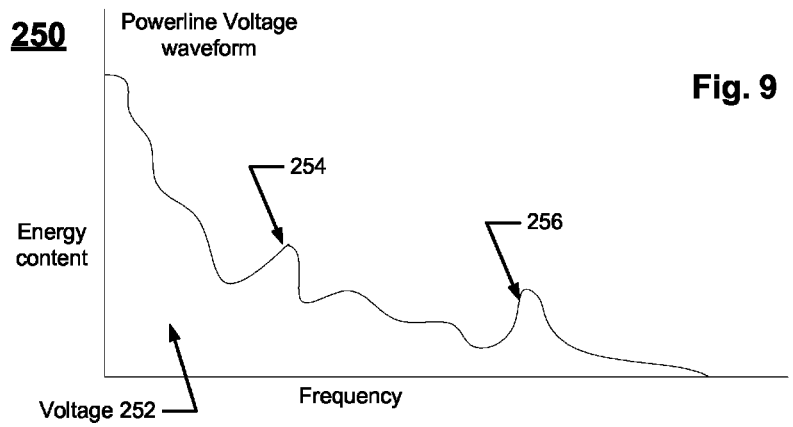
FIGS. 9-11 depict how power line noise can be reduced to protect an IC according to an embodiment.

FIG. 9 depicts an illustrative plot 250 of energy content in a powerline signal with respect to frequency. As depicted in a low-frequency region 252 the received input signal has comparatively high energy content. Example spikes in energy content 254 and 256 are illustrated at different frequencies. FIG. 9 conceptually illustrates a general relationship between frequency and energy content of noise.

Figure 10:
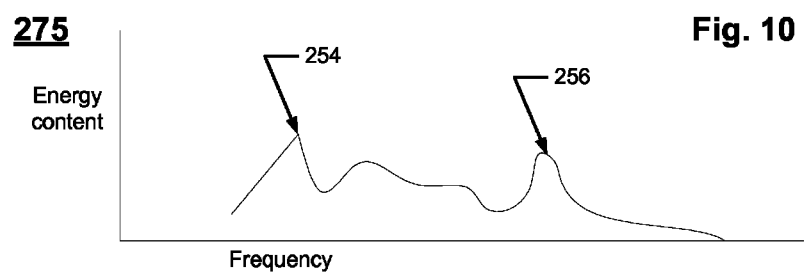

FIG. 10 depicts a plot 275 of an output of a first module that high pass filters the powerline signal. As shown, the low-frequency energy content has largely been attenuated but energy content in higher frequencies, including unwanted spikes 254 and 256 may remain. An amount of attenuation of higher frequency noise energy may depend in part on how responsive Zener diode pair 70 is and whether a particular voltage spike has a slew rate in excess of the capabilities of the diodes in Zener diode pair 70. This effect can be modeled also by estimating an amount of parasitic capacitance introduced into the circuit by Zener diode pair 70. Higher parasitic capacitance will reduce higher frequency response capabilities of Zener diode pair 70 and allow more higher frequency noise to pass into transformer 65.

Figure 11:
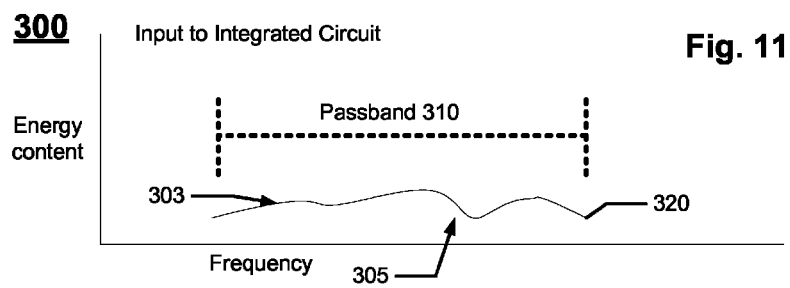

FIG. 11 depicts a plot 300 of an powerline signal 320 to be provided to a protected integrated circuit (e.g., integrated circuit 51 of FIG. 2). A passband 310 defines an extent of frequency content remaining in the powerline signal after filtering. As shown, higher energy spikes 254 and 256 now have been smoothed, and the total energy content of noise has been reduced.

Referring again to FIG. 2, filtering at higher frequencies can be modeled based on parasitic capacitances of Schottky diodes 61 and 62 of Schottky diode pair 60. By comparison, Schottky diodes 61 and 62 of Schottky diode pair 60 will more effectively attenuate higher frequency noise content than Zener diode pair 70. Further characterization of these relative differences follows.

An overall behavior of circuits in FIG. 2 also will be affected by parasitic inductance of transformer 65. The combination of parasitic inductance from transformer 65 and each of the parasitic capacitances identified above create a passband filtering situation. A particular range of the passband for a particular application can be selected by varying the components selected to make a circuit.

Figure 12:
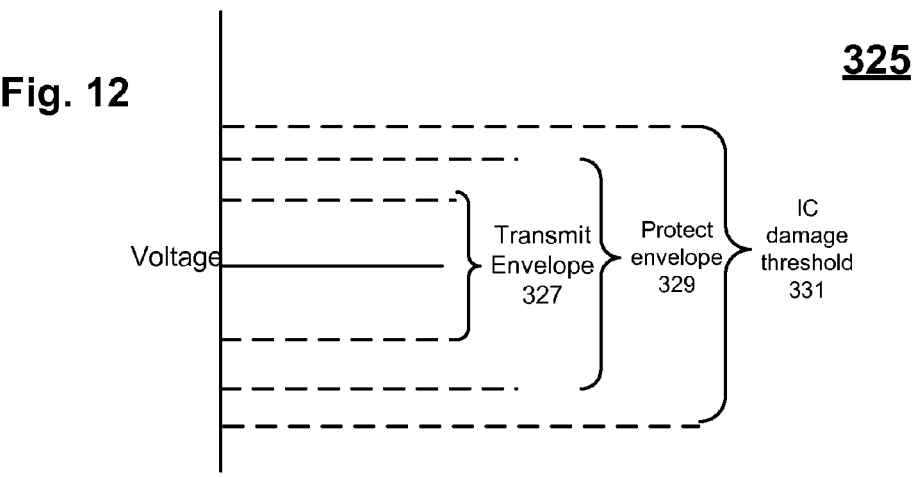
FIGS. 12 and 13 depict aspects of how a transmit envelope for a protected differential transceiver can relate to other voltage levels of interest in a power line communication circuit.

FIG. 12 depicts a diagram 325 that shows relative values of certain voltages of interest. A transmit envelope 327 depicts an expected peak to peak voltage to be transmitted from a protected integrated circuit. A protection envelope 329 depicts a peak to peak voltage value intermediate transmit envelope 327 and a threshold 331 at which damage to the integrated circuit may occur. Damage typically occurs when input voltages exceed a safe operating range of the integrated circuit (e.g., greater than breakdown voltages of transistors inside the integrated circuit). Depending on implementation, such as by accounting for tolerances of components to be used, these envelopes can be made closer together or farther apart. Design considerations relating to process technology and a desired power supply level also may be factored into the design. For example if too much margin is left between protection envelope 329 and threshold 331, peak to peak amplitude of the transmit envelope 327 will be restricted. In practice, peak to peak transmit envelope 327 may be dictated by considerations such as conforming to a standardized specification or by a need to maintain a particular signal-to-noise ratio under defined conditions.

Figure 13:
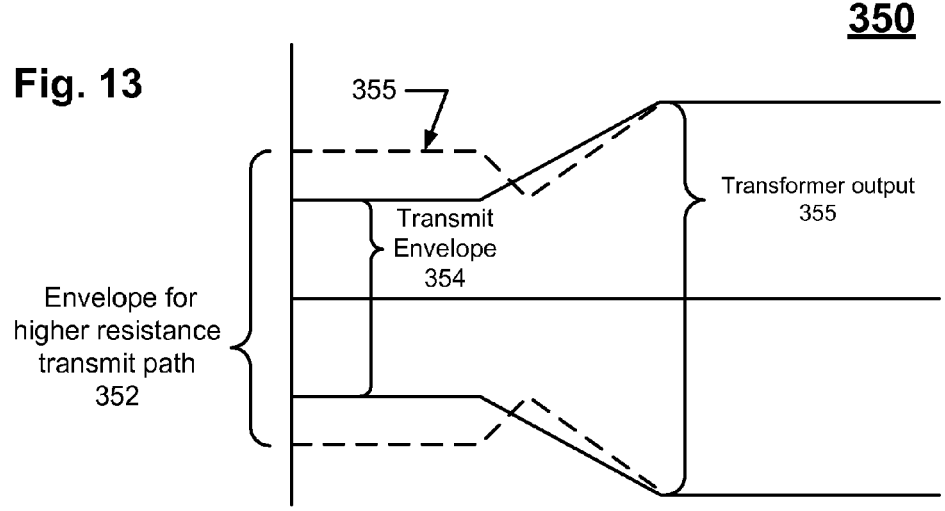

Consistent with the diagram of FIG. 12, FIG. 13 depicts a plot 350 that shows a transmit envelope 354 with a given peak to peak voltage swing. Advantageously, transmit paths according to particular embodiments provide comparatively lower resistance and signal attenuation. Therefore, to reach a desired transmit level 355 at a transformer output, transmit envelope 354 can be smaller than a comparative envelope 352 that uses series resistances and the same transformer winding configuration.

In a specific example application, circuits according to the disclosure can be used to protect circuitry used for power line communication applications. In one example, a peak to peak voltage level to be injected into a power line is under 26V to 28V peak to peak. Referring back to FIG. 2, for example, each diode of back-to-back Zener diode pair 70 can be set to have a breakdown voltage of around 12V, so that including a forward voltage of the other diode of the pair, a peak to peak voltage of around 26-28V can be obtained.

Transformer 65 can be set to have a 2:1 winding ratio so that a voltage output from the ports 30 and 31 of the integrated circuit 51 is approximately doubled by transformer 65. Other example winding ratios for transformer 65 include winding ratios in the range between 2:1 and 5:1. In an implementation, transformer 65 is fabricated with triple-insulated winding wire. A different transformer could be used for a higher resistance signal transmission path, but a transformer with a higher winding ratio has a lower bandwidth than a transformer with a lower winding ratio—holding fabrication technology (e.g., wire and winding techniques) constant.

Voltage output from ports 30 and 31 of the integrated circuit 51 can be around 10V peak to peak. A 10V peak to peak output is lower than typical for powerline communication applications, but allows use of a 5V Vdd and opens a possibility of using a full CMOS implementation. Attenuation through a protection circuit according to some embodiments is low enough so that an injection level into a powerline is within a specification or otherwise allows a signal to noise ratio to be within required parameters at receivers of the powerline signal. A filtering capability of the circuit can be modeled based on parasitics of transformer 65, parasitics of Zener diode pair 70, and parasitics of Schottky diode pair 60. In an example, parasitic capacitance of Zener diodes forming Zener diode pair 70 can be on the order of 100 pF or less, such as around 85 pF. Parasitic capacitances of Schottky diode 61 and 62 may be on the order of 1 pF to 5 pF, or up to around 10 pF. These relative values show that Schottky diode pair 60 will be relatively efficient to filter high frequency noise, compared with Zener diode pair 70. In different implementations, components of circuit 50 may have different characteristics, and the characteristics explained herein are to aid a person of ordinary skill in constructing implementations of circuit 50, and not by way of limitation.

In some implementations, components to construct implementations of the example circuit may be discrete components assembled using technologies such as wire bonding, surface mount soldering, and so on, as may be appropriate for the packages of each of the discrete components, and a form factor of an overall package or portion of a package to contain the implementation of the circuit. In other implementations, a portion of these components may be implemented in a system on chip approach, where the circuit is a subsystem that protects circuitry implementing other functions. Portions of the circuit also can be implemented in a multichip module, where certain components may be provided within an overall package but not integrated within a single subsubstrate. For example, Schottky diode pairs may be implemented within a package or in an integrated circuit to be protected. However, a consideration involved with implementing the Schottky diodes is that the voltage swings on the nodes of the transceiver can be limited to remain within a range that can be injected into the integrated circuit without damage thereto. These considerations relate both to maximum voltages and an overall energy imparted to the integrated circuit from an overvoltage condition.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the scope of the disclosure as defined by the claims.

What is claimed is:

1. A circuit comprising:
a pair of capacitors, each capacitor having a first terminal and a second terminal, wherein a powerline voltage is applied between the first terminal of each capacitor;
a transformer, having a first winding and a second winding, each of the first winding and the second winding having a first end and a second end, the first end of the first winding being electrically connected with the second terminal of a first capacitor of the pair of capacitors, and the second end of the first winding being electrically connected with the second terminal of a second capacitor of the pair of capacitors;
a pair of zener diodes, wherein anodes of each of the pair of zener diodes are electrically connected to each other, and wherein cathodes of each of the pair of zener diodes are electrically coupled to a different one of the first end and the second end of the first winding of the transformer;
a low resistance coupling configured to interconnect a CMOS-based integrated circuit having an analog front end with the circuit;
a first diode pair, wherein an anode of a first diode is electrically connected to a reference voltage, and a cathode of the first diode is electrically connected to (i) an anode of a second diode, (ii) the first end of the second winding of the transformer, and (iii) a first port of the low resistance coupling, and a cathode of the second diode is electrically connected to (i) a power supply and (ii) a first terminal of a third zener diode, wherein a second terminal of the third zener diode is electrically connected to the reference voltage; and
a second diode pair, wherein an anode of a third diode is electrically connected to a reference voltage, and a cathode of the third diode is electrically connected to (i) an anode of a fourth diode, (ii) the second end of the second winding of the transformer, and (iii) a second port of the low resistance coupling, and a cathode of the fourth diode is electrically connected to (i) the power supply and (ii) a first terminal of a fourth zener diode, wherein a second terminal of the fourth zener diode is electrically connected to the reference voltage.

2. The circuit of claim 1 wherein the pair of zener diodes are configured as a low pass filter.

3. The circuit of claim 1 wherein the first diode pair and the second diode pair comprise high pass filters.

4. The circuit of claim 1, further comprising the CMOS-based integrated circuit, wherein the first diode pair and the second diode pair are integrated on the CMOS-based integrated circuit.

5. The circuit of claim 1 wherein the transformer steps up a voltage produced by the CMOS-based integrated circuit.

6. The circuit of claim 1 wherein the CMOS-based integrated circuit is a two-port differential transceiver.

7. The circuit of claim 1 wherein a breakdown voltage of (i) the third zener diode and (ii) the fourth zener diode is set at a voltage of the power supply plus a maximum expected variation in the voltage of the power supply.

8. The circuit of claim 1, wherein the low resistance coupling does not include a series resistor and any resistance of the low resistance coupling is based on parasitic resistance.

9. A powerline communication system comprising:
a CMOS-based differential transceiver having a low resistance coupling that includes a first port and a second port;
a first diode and a second diode electrically connecting a reference voltage to each of the first port and the second port, respectively;
a third diode and a fourth diode electrically connecting a power supply to each of the first port and the second port, respectively;
a first zener diode and a second zener diode each electrically coupled between the power supply and the reference voltage and having a breakdown voltage greater than a voltage of the power supply;
a transformer configured to step up a voltage difference applied by the differential transceiver across the first port and the second port from a first winding to a second winding, the second winding having a first end and a second end;
a pair of zener diodes, comprising a third zener diode and a fourth zener diode, having (i) respective cathodes of the third zener diode and the fourth zener diode electrically coupled to one of the first end and the second end of the second winding and (ii) anodes of the third zener diode and the fourth zener diode electrically coupled together; and
a pair of capacitors, each capacitor connected in series between a powerline and one of the first end and the second end of the second winding.

10. The system of claim 9 wherein the pair of zener diodes comprise a low pass filter.

11. The system of claim 9 wherein the first diode and the second diode comprise a first high pass filter, and wherein the third diode and the fourth diode comprise a second high pass filter.

12. The system of claim 9 wherein the first diode, the second diode, the third diode and the fourth diode are integrated on the CMOS-based differential transceiver.

13. The system of claim 9 wherein the transformer steps up a voltage produced by the CMOS-based differential transceiver.

14. The system of claim 9 wherein the CMOS-based differential transceiver is a two-port differential transceiver that operates on voltages of less than about 5.0 volts.

15. A method comprising:
receiving a powerline signal from a powerline;
low pass filtering the powerline signal, said low pass filtering comprising receiving the powerline signal on a first winding of a transformer, wherein the first winding of the transformer is electrically coupled to a pair of zener diodes that include a first zener diode and a second zener diode;

high pass filtering the powerline signal, said high pass filtering comprising transmitting the powerline signal onto a second winding of the transformer, wherein the second winding of the transformer is electrically coupled to a power supply through a first diode and to a reference voltage through a second diode, wherein the first diode and second diode define a maximum voltage range of the powerline signal;

via a low resistance coupling, receiving the powerline signal in a CMOS-based integrated circuit after said high pass filtering;

transmitting a signal from the integrated circuit;

high pass filtering the transmitted signal using the first diode and second diode; and low pass filtering the transmitted signal using the first and second zener diodes of the pair of zener diodes.

16. The method of claim 15 wherein the transformer attenuates the powerline signal.

17. The method of claim 15 further comprising: generating a voltage across a third zener diode during a period of transient operation if a voltage from the power supply is not stabilized, wherein the voltage across the zener diode is greater than the voltage from the power supply if the power supply is stabilized.

18. The method of claim 17 wherein the transmitted signal from the CMOS-based integrated circuit has a first envelope less than a second envelope defined by said maximum voltage range, and said maximum voltage range is less than a safe operating range of the CMOS-based integrated circuit.

19. The method of claim 15 wherein the first diode and the second diode are integrated on the CMOS-based integrated circuit.

* * * * *